June 2, 1970  S. C. BARNES ET AL  3,515,597
METHOD OF MAKING INTERCELL CONNECTORS IN BATTERIES
Filed Sept. 6, 1968  3 Sheets-Sheet 2
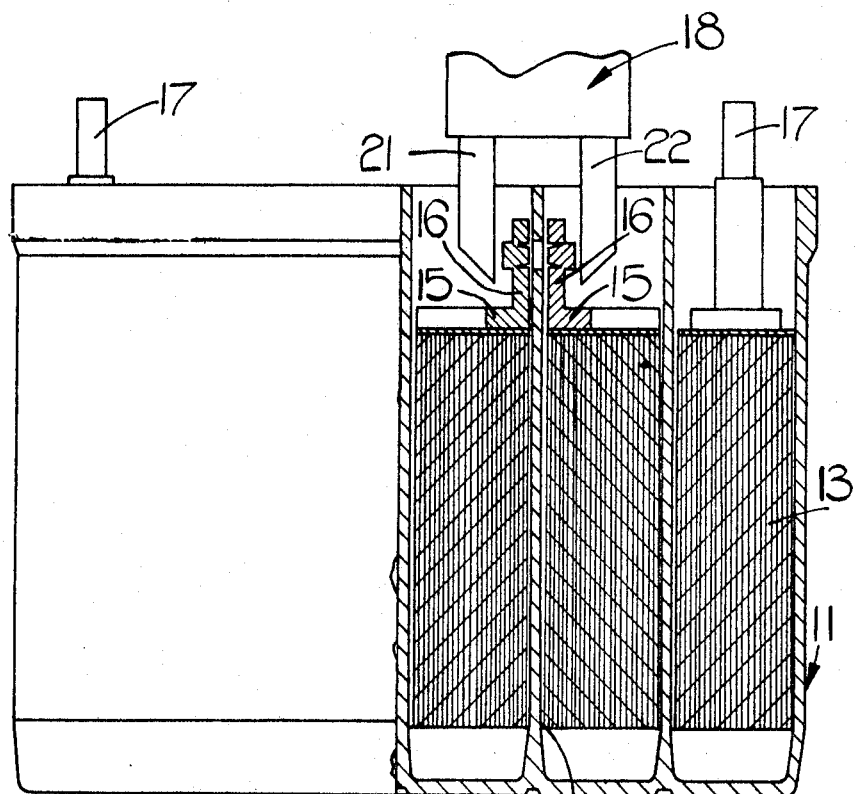
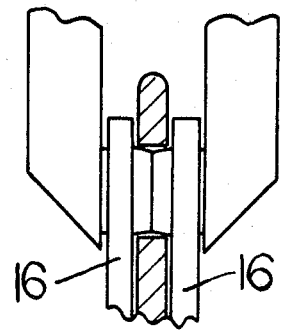
FIG.4.
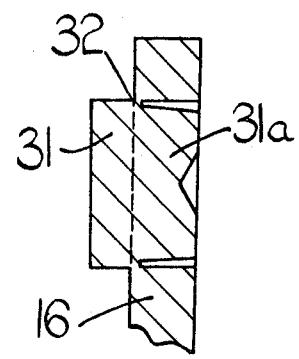
FIG.5.
INVENTOR
John Derek Harris, Stanley Charles Barnes & Kenneth Stanley Owen.
BY Glascock, Downing &
Seebold
ATTORNEYS June 2, 1970  S. C. BARNES ET AL  3,515,597
METHOD OF MAKING INTERCELL CONNECTORS IN BATTERIES
Filed Sept. 6, 1968  3 Sheets-Sheet 3

INVENTOR
John Derek Harris, Stanley Charles Barnes & Kenneth Stanley Owen
BY
ATTORNEYS United States Patent Office 3,515,597
Patented June 2, 1970

3,515,597
METHOD OF MAKING INTERCELL CONNECTORS IN BATTERIES
Stanley Charles Barnes, Berkswell, near Coventry, John Derek Harris, Solihull, and Kenneth Stanley Owen, Birmingham, England, assignors to Joseph Lucas (Industries) Limited, Birmingham, England, a British company
Filed Sept. 6, 1968, Ser. No. 757,989
Claims priority, application Great Britain, Sept. 8, 1967, 41,066/67; Jan. 1, 1968, 16/68
Int. Cl. H01m 35/18, 35/32
U.S. Cl. 136—134                    7 Claims

ABSTRACT OF THE DISCLOSURE

In the formation of an intercell connection in an electric storage battery by resistance welding through a hole in the cell wall, the material to fill the hole in the cell wall is provided by a projection which extends rearwardly from a strap connected to the plates. The rearward extension allows the plates to be inserted into the cells, but the projection can be forced through its strap into the hole before the resistance welding operation.

---

It is known to interconnect plate groups (i.e. packs of battery plates and separators) in adjacent cells of an electric storage battery by resistance welding. For this purpose the appropriate plates in each group are connected to a bar having an integral strap upstanding from one end thereof so as to lie parallel to the partition wall within which the hole is formed. The two straps are then interconnected through the wall, and for this purpose one of the straps may be formed with an integral projection which extends through the hole and contacts the other strap, or both straps can be formed with integral projections which interengage within the hole, or alternatively a separate slug can be inserted within the hole. In all three cases electrodes are brought into contact with the straps and current is passed between them whilst pressure is maintained to interconnect the strap and at the same time seal the hole.

Where a strap is formed with an integral projection, difficulty is experienced in inserting the plate group in its cell, because the projection fouls the partition wall. Similarly, where a separate slug is placed in the hole, the slug must extend from each end of the hole, and the slug fouls the plate group as the plate group is inserted.

The present invention, which seeks to overcome these difficulties, utilizes a strap having associated therewith a projection which extends rearwardly from the strap so that it does not foul the partition wall. However, although the projection extends rearwardly, it can be moved under pressure so that it is forced into the hole, either into contact with a similar projection on the other strap, or into contact with the other strap itself. The welding pressure and current then not only interconnect the two straps, but ensure that the or each movable projection is connected to its own strap.

Figure 1:
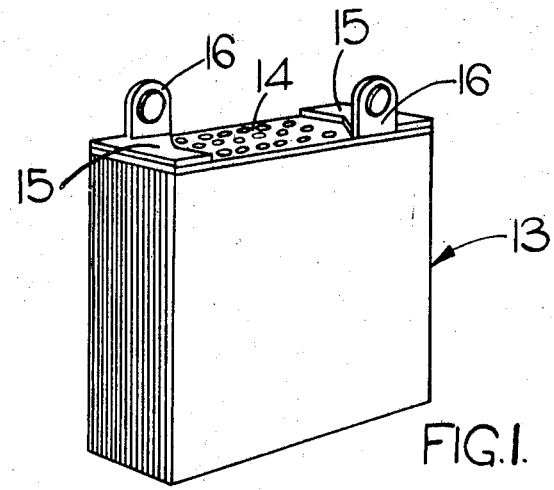
Figure 2:
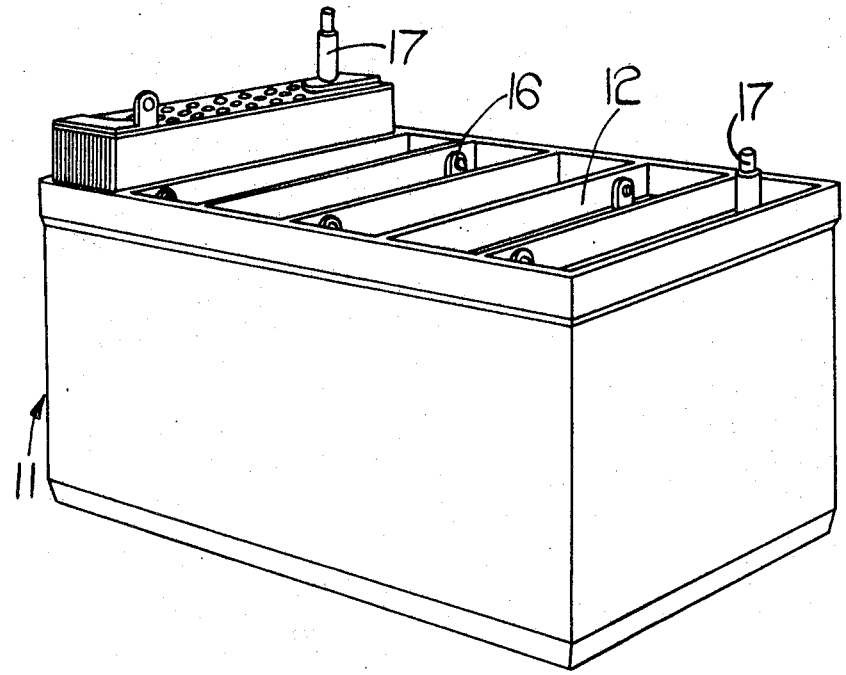

An example of the invention is illustrated in the accompanying drawings, in which:

FIG. 1 is a perspective view of a pack of battery plates and separators,

FIG. 2 is a perspective view of a battery box with all but one of the packs in position, FIG. 3 is a part-sectional view of the battery box illustrating a stage in the method before the completion of the intercell connections, FIG. 4 is a fragmentary view similar to FIG. 3 but showing the intercell connection prior to the passage of welding current, FIG. 5 is an enlarged sectional view of part of an intercell connector prior to completion of the intercell connection.

Figure 6:
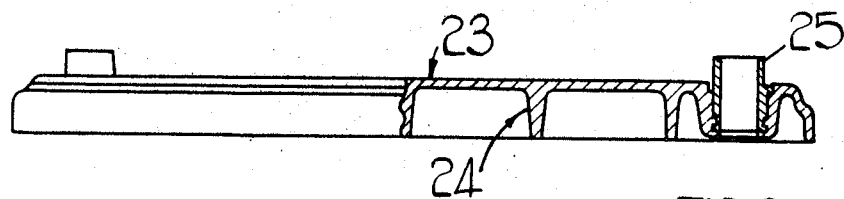

FIG. 6 is a part-sectional view of the battery box lid, and

Figure 7:
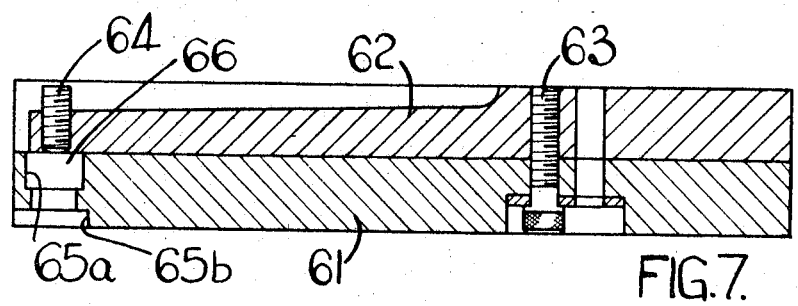
Figure 8:
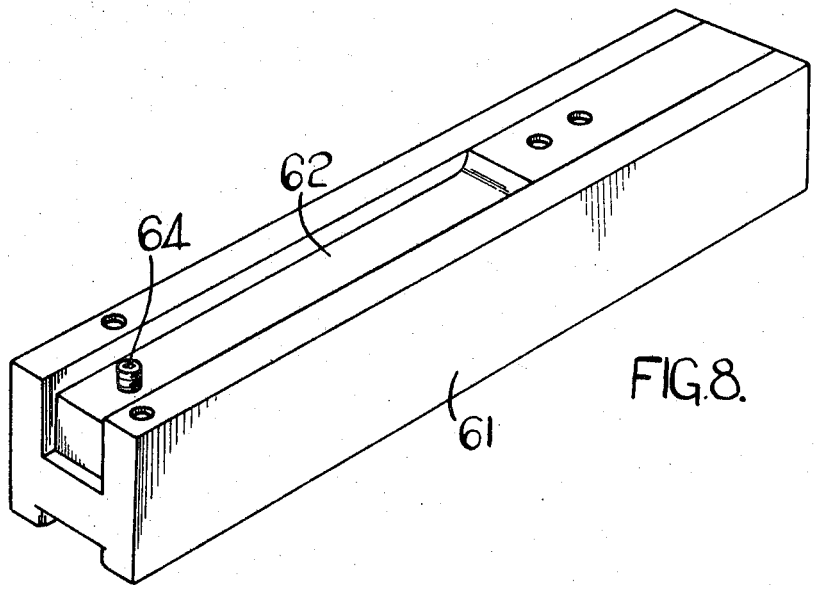

FIGS. 7 and 8 respectively are a longitudinal section and a perspective view of one form of welding electrode.

Referring to the drawings, a battery box 11 is moulded from rubber or a thermoplastic, for example polypropylene, the box including partition walls 12 dividing the box into six compartments. Each compartment receives a preformed pack 13 of battery plates and separators, the tops of the plates and separators being protected by a perforated splash guard 14. The plates in the individual packs are interconnected in parallel, and the two sets of plates in each of the four packs which are to be mounted in the central compartments of the box 11 are connected respectively to conductive bars 15 formed with integral straps 16 which in use extend substantially parallel to the partition walls 12. The straps 16 are formed integrally with projections 31, best shown in FIG. 5, it will be noted that the projections 31 extend rearwardly from the straps 16, considered relative to the partition walls, and are connected to their appropriate straps 16 by a thin neck portion 32 which is frangible.

The packs which are to be placed in the end compartment of the battery box each having one set of plates connected to a bar 15, but their other set of plates connected respectively to the terminal posts 17 of the battery.

The partition walls 12 have holes formed therein, and the arrangement is such that when the packs are positioned in the box 11, each projection 31 will be opposite a hole. Because the projections 31 extend rearwardly, they do not interfere with the insertion of the packs into the compartment. When the packs are all in position, a tool 18 incorporating a pair of welding electrodes 21, 22 is positioned with the electrodes 21, 22 engaging a pair of projections 31 to be interconnected, and pressure is applied to cause the projections 31 to move towards one another until they are in contact within the hole in the partition wall, as shown in FIG. 4. During this part of the operation, each projection 31 is forced into and through the hole in the strap 16, and it will be noted that each projection is of greater cross-section than the hole in its associated strap 16, so that the projection will be a tight fit within the hole in the strap 16.

When the projections are in contact, welding current is passed between them, this current causing the projections to become interconnected and firmly connected to their appropriate straps 16. The welding operation seals the hole, and although not shown in the drawings, it is preferably to form the straps with upstanding rings surrounding the projections, these rings biting into the partition wall to assist in sealing the hole in the partition wall, and also serving to prevent movement of each pack in a direction parallel to the partition walls. In a typical example using a 50 c./s. mains supply, a two thousand pound force was applied for 15 cycles, after which the force was maintained and a current of 20,000 amps was passed for 40 cycles, whereafter the current was stopped but the pressure was applied for a further 90 cycles.

When all the intercell connections have been made, a lid shown in FIG. 6 is secured to the battery box. The lid 23 is also moulded from polypropylene and has a peripheral edge adapted to engage the top of the box, together with ribs 24 adapted to engage the tops of the walls 12. The lid is moulded with six filling holes (not shown) which, when the lid is in position, are above the six compartments respectively, and is further formed with a pair of integral upstanding hollow spigots 25 which receive the terminal posts 17 respectively. The welding is effected by bringing both the box and the lid into physical engagement with a heated plate, and then pressing the box and lid together.

Although it is clearly more convenient to use the welding electrode to force the projections into engagement with one another, and then to pass the welding current, it will be appreciated that separate tools could be employed for these two operations if desired. FIGS. 7 and 8 show a form of welding electrode suitable for use after the projections have been forced into engagement with one another.

Referring to FIGS. 7 and 8, the electrode includes a body 61 having in one surface a slot in which a leaf spring 62 is secured by means of a screw 63. The free end of the leaf spring 62 is urged downwardly into contact with the body 61 by virtue of its own resilience, and incorporates an adjustable grub screw 64 urging a stepped cylindrical insert 16 into the stepped portion 65a of a bore 65 formed in the body 61. The bore 65 is shaped as shown at 65b to accept the strap 16, and the arrangement is such that during welding the leaf spring 62 will first flex, and then apply a controlled pressure to the strap 16 through the intermediary of the screw 64. The pressure can, of course, be adjusted by varying the setting of the screw 64. In a typical example using the electrode shown in FIGS. 7 and 8, a 50 c./s. mains supply was employed, and a force varying between 750 and 1500 pounds was applied for 20 cycles, the increase in force from 750 to 1500 pounds being caused by the recovery of the leaf spring 62. A current of 6500 amps was then passed for 60 cycles after which the current was stopped but the pressure maintained for another 5 seconds.

In a modification, the projections 31 are separate from the straps 16, which are formed with holes in which the projections 31 engage as a tight fit. This modification makes no difference to the method described.

A similar method to that described can be used to form a connection through a wall of the battery box so as to provide, for example, an 8 volt tapping on a 12 volt battery.

Having thus described our invention what we claim as new and desire to secure by Letters Patent is:

1. A method of interconnecting plate groups situated in adjacent cells of an electric storage battery through a hole in a partition wall between the cells, comprising connecting the plate groups to a pair of conductive bars respectively which at their ends adjacent the partition wall are formed with straps extending substantially parallel to the partition wall, placing the plate groups within their respective cells, there being no material within the hole in the partition wall at this stage, but at least one of said straps having associated therewith a projection which extends from the strap in a direction away from the partition wall, applying a force to said projection to cause it to move relative to its strap into the hole in the partition wall and to make contact with part of the other strap, and then forming a connection between the straps by resistance welding, the resistance welding serving further to seal the hole in the partition wall and to ensure that the projection is firmly connected to its strap.

2. A method as claimed in claim 1 in which each of the straps has associated therewith a projection, and the force is applied to both projections so that the projections are moved simultaneously and meet within the hole in the partition wall.

3. A method as claimed in claim 2 in which the force is applied to each projection through the intermediary of the welding electrodes.

4. A method as claimed in claim 3 in which each electrode includes a resilient portion which is deformed when the force is first applied to the projections, and then reassumes its original position to apply a progressive force to the projections.

5. A method as claimed in claim 2 in which each projection has a cross-section greater than the cross-section of a hole within its strap which it will occupy after teh welding operation, so ensuring a tight fit between the projection and its strap.

6. A method as claimed in claim 2 in which each projection is integral with its strap.

7. A method as claimed in claim 2 in which each projection is separate from its strap but is a tight fit in a hole in its strap.

References Cited

UNITED STATES PATENTS

| 3,275,793 | 9/1966 | Frischkorn et al. | |
| 3,313,658 | 4/1967 | Sabatino et al. | 136—134 |
| 3,364,076 | 1/1968 | Buttke et al. | 136—134 |

WINSTON A. DOUGLAS, Primary Examiner

D. L. WALTON, Assistant Examiner

U.S. Cl. X.R.

136—176